(12) United States Patent
Ohtani

(10) Patent No.: US 8,184,990 B2
(45) Date of Patent: May 22, 2012

(54) LIGHT SOURCE WAVELENGTH CONTROL APPARATUS

(75) Inventor: Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 11/561,505

(22) Filed: Nov. 20, 2006

(65) Prior Publication Data

US 2007/0223925 A1    Sep. 27, 2007

(30) Foreign Application Priority Data

Mar. 23, 2006  (JP) ................................ 2006-081645

(51) Int. Cl.
*H04B 10/00* (2006.01)
(52) U.S. Cl. ......... 398/196; 398/192; 398/200; 398/201
(58) Field of Classification Search .............. 398/79–87, 398/182–201
See application file for complete search history.

(56) References Cited

U.S. PATENT DOCUMENTS

| | | | | |
|---|---|---|---|---|
| 5,617,234 A * | 4/1997 | Koga et al. | .................. | 398/14 |
| 5,696,859 A * | 12/1997 | Onaka et al. | .................. | 385/24 |
| 5,894,362 A * | 4/1999 | Onaka et al. | .................. | 398/95 |
| 6,067,181 A * | 5/2000 | Mizrahi | .................. | 398/196 |
| 6,304,350 B1 * | 10/2001 | Doerr et al. | .................. | 398/9 |
| 6,327,064 B1 * | 12/2001 | Zhu | .................. | 398/196 |
| 6,766,116 B2 * | 7/2004 | Webb | .................. | 398/196 |
| 6,832,048 B2 * | 12/2004 | Ishida et al. | .................. | 398/87 |
| 6,925,266 B1 * | 8/2005 | Muller | .................. | 398/196 |
| 6,993,258 B2 * | 1/2006 | Payne et al. | .................. | 398/92 |
| 7,020,398 B2 * | 3/2006 | Takiguchi et al. | .................. | 398/158 |
| 7,039,319 B1 * | 5/2006 | Moulton et al. | .................. | 398/95 |
| 7,286,771 B2 * | 10/2007 | Helbing et al. | .................. | 398/194 |
| 7,295,783 B2 * | 11/2007 | Singh et al. | .................. | 398/175 |
| 7,359,648 B2 * | 4/2008 | Rubin et al. | .................. | 398/182 |
| 7,519,246 B2 * | 4/2009 | Welch et al. | .................. | 385/14 |
| 2002/0041414 A1 * | 4/2002 | Oguma | .................. | 359/130 |
| 2002/0149818 A1 * | 10/2002 | Tomofuji et al. | .................. | 359/124 |
| 2005/0213979 A1 | 9/2005 | Nakashima et al. | | |
| 2005/0220458 A1 * | 10/2005 | Kupershmidt et al. | ....... | 398/196 |
| 2005/0286909 A1 * | 12/2005 | Kish et al. | .................. | 398/196 |
| 2006/0093362 A1 * | 5/2006 | Welch et al. | .................. | 398/87 |
| 2006/0177225 A1 * | 8/2006 | Paraschis et al. | .................. | 398/87 |

FOREIGN PATENT DOCUMENTS

| | | |
|---|---|---|
| JP | 2002-519870 | 7/2002 |
| JP | 2004-112714 | 4/2004 |
| JP | 2005-277686 | 10/2005 |

OTHER PUBLICATIONS

Japanese Office Action mailed Nov. 16, 2010 in Japanese Application No. 2006-081645.
Japanese Office Action mailed Jul. 26, 2011 in corresponding Japanese application No. 2006-081645.

* cited by examiner

*Primary Examiner* — Agustin Bello
(74) *Attorney, Agent, or Firm* — Staas & Halsey LLP

(57) ABSTRACT

Equipped between a transmitter 20 and an optical multiplexer module 25 of a division/multiplexer unit 24 are band-pass filters 23-1 through 23-m letting only a light of right wavelength pass while reflecting other wavelengths light. The transmitter 20 is equipped with a reflection light monitor 26 for monitoring a reflection light from the band-pass filters 23-1 through 23-m for examining an intensity of a reflection light. A wavelength of a light oscillated by a tunable laser diode (LD) unit 21 is controlled so as to make the intensity of the light smaller than a threshold value.

13 Claims, 15 Drawing Sheets

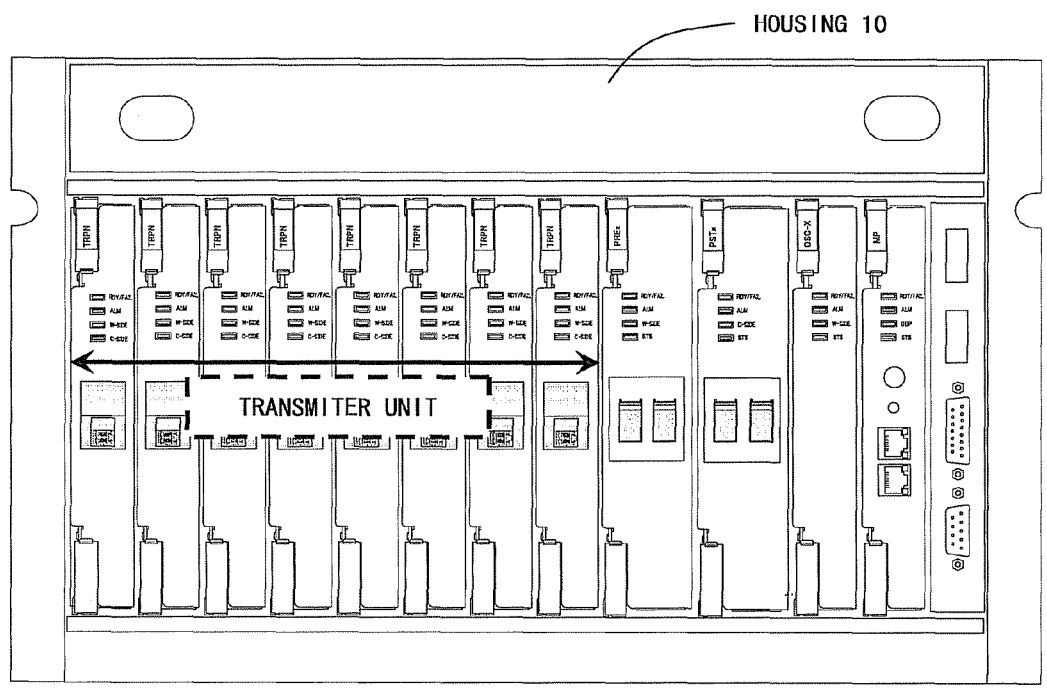
F I G. 1

FIG. 5A  COMBINATION OF BULK TYPE COMPONENTS

FIG. 5B  ADDITION OF FBG TO A WAVEGUIDE DEVICE

FIG. 5C  CASCADE CONNECTION OF THREE-PORT MODULE

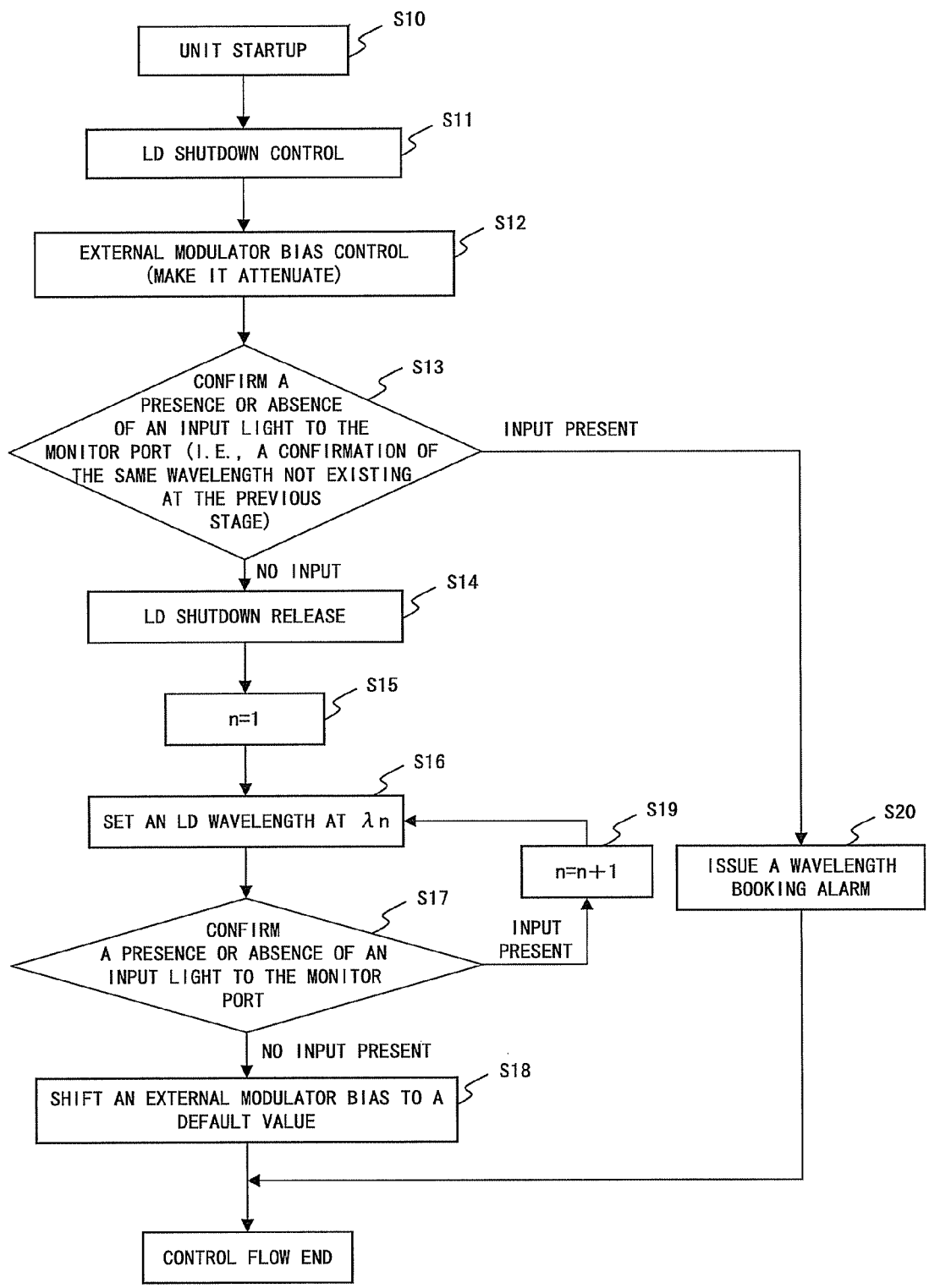
F I G. 11

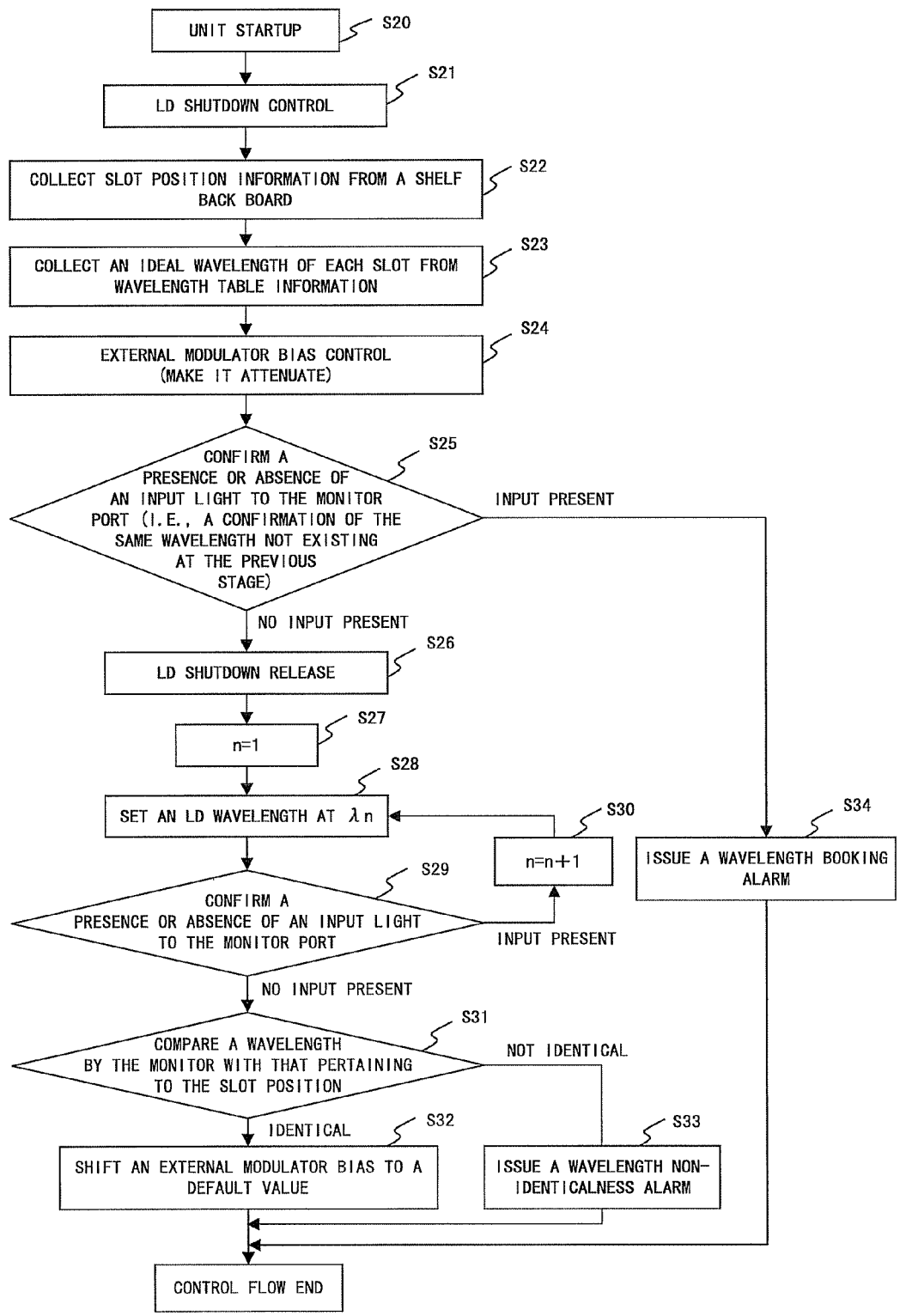
F I G. 1 3

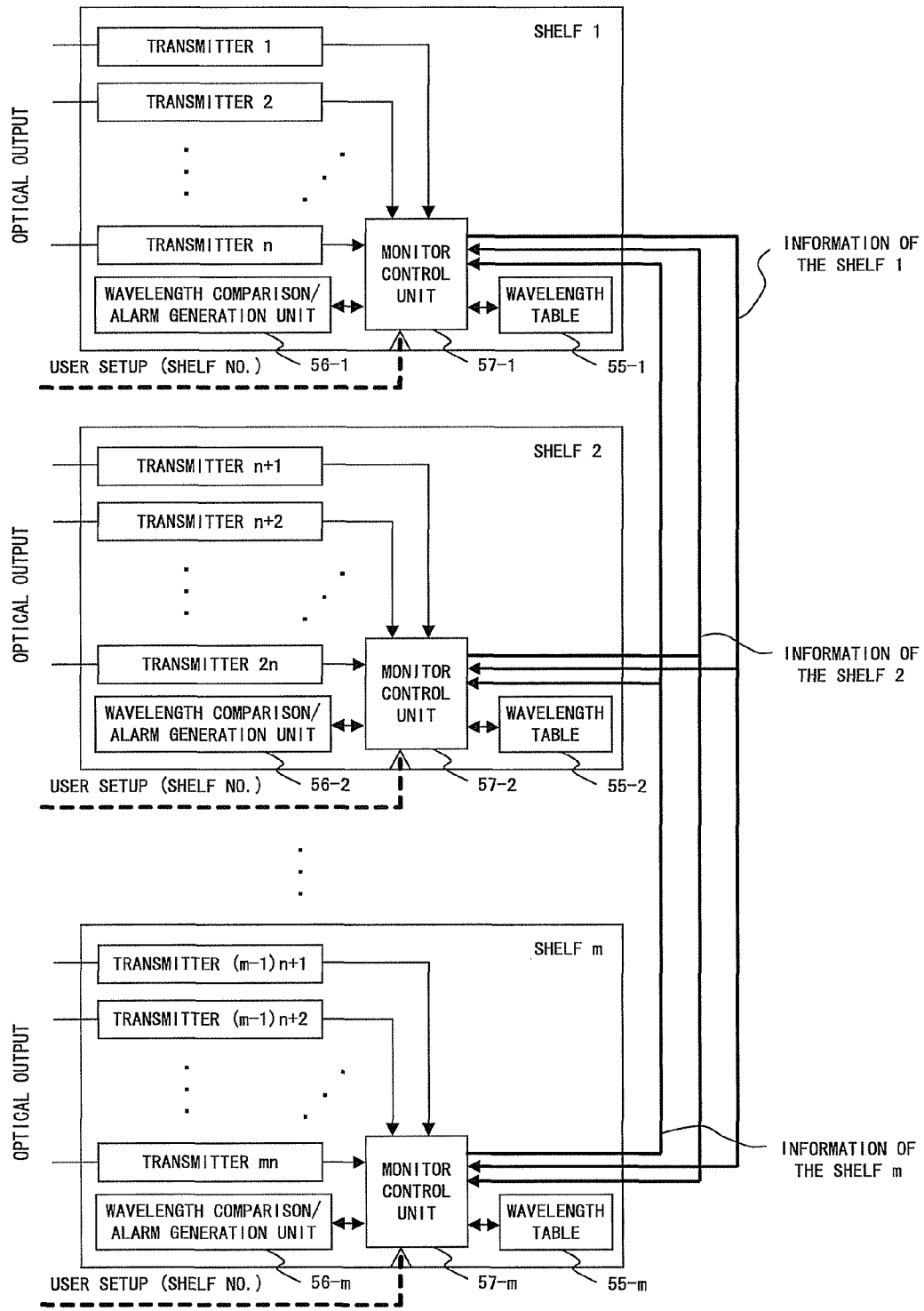
F I G. 14

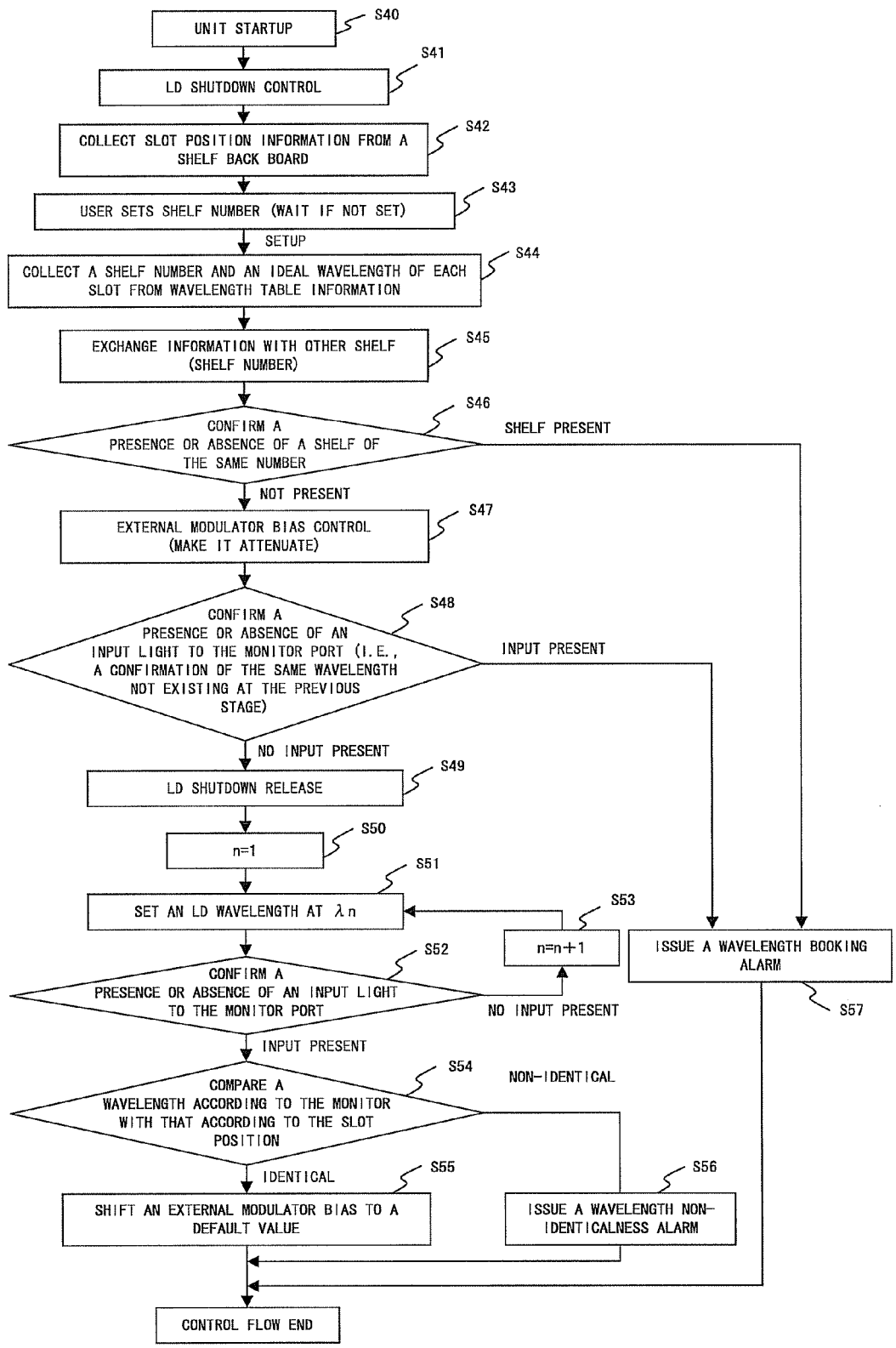
F I G. 15

LIGHT SOURCE WAVELENGTH CONTROL APPARATUS

BACKGROUND OF THE INVENTION

1. Field of the Invention

The present invention relates to a light source wavelength control apparatus for use in a wavelength division multiplexing (WDM) optical telecommunication system.

2. Description of the Related Art

Recently, a signal generation part of a WDM optical transmission apparatus is equipped with a tunable laser diode (LD) capable of varying an output wavelength. A conventional tunable LD has been mainly of a type changing a wavelength by varying temperature of a peltiert device which maintains an LD temperature at constant, which is one varying a wavelength by a change of a refraction index of an active layer having a narrow range of variable wavelength, i.e., 2 to 4 nm.

However, recently becoming a mainstream is one capable of varying a wavelength fully in a C band range (or in an L band range) by controlling an external resonator attached externally to an LD element, thereby making a resonating optical path variable.

In a WDM apparatus, it is necessary to set a wavelength for each of the same tunable LDs equipped on individual transmitters at the time of operating it in order to obtain a desired wavelength. Conventionally performed method has been for setting a wavelength manually or recognizing an apparatus slot position on which the transmitter itself is mounted by the apparatus itself and setting a wavelength for the apparatus itself.

FIG. 1 is a diagram illustrating a conventional WDM optical transmission apparatus.

Inserted into a housing 10 are panels equipped with various functions, and the panels are interconnected by optical cables or electric wirings. Equipped on the left half of the housing 10 is a plurality of transmitter units including tunable LDs. A method for setting a wavelength for each of the transmitter units employs a method of a manual setup or of having each transmitter unit automatically recognize as to which slot the apparatus itself has been inserted in and set a wavelength automatically.

A manual setup, however, needs a very large amount of work when there are a large number of wavelengths. A method of an automatic setup by recognizing a slot position is an effective method for a configuration having only one shelf, whereas, in the case that there is a plurality of mounting shelf of transmitters for a multiple wavelength WDM telecommunication system, requiring a recognition as to which a wavelength-use slot to which the apparatus itself is inserted after performing an information exchange between shelves because there is a necessity of recognizing a type of a shelf in addition to a slot position, thus necessitating a complex control sequence.

FIG. 2 is a conceptual diagram of a configuration of a transmitter for use in a multiple wavelength WDM telecommunication system.

A single transmitter housing shelf is capable of housing a plurality of light sources, of which the number is up to tens at most. Therefore, a single shelf is not capable of accommodating all light sources for a recent multiple wavelength WDM telecommunications which multiplexes no less than hundred wavelengths, thus needing to furnish a plurality of transmitter housing shelves, multiplex the lights of respective wavelengths output from these shelves by a multiple wavelength multiplexing and division plus amplification apparatus 11 for sending them out to telecommunication paths.

Furthermore, this method is faced with a difficulty in recognizing an existence of a mistake if there is a wrong connection between a physical slot for mounting a transmitter and a module for multiplexing the lights, and, further, an increased difficulty in identifying a wrong connection point with the number of optical fibers which is proportionate to the number of wavelengths.

A transmission wave control method for a conventional WDM optical transmission system includes a patent document 1 which has disclosed a technique for controlling an output wavelength of a transmitter by detecting a return light back to the transmitter.

[Patent document 1] Japanese Patent Application Publication No. 2005-277686

FIG. 3 is a diagram describing a problem associated with the conventional technique.

Individual transmitters 15-1 through 15-n respectively output wavelengths $\lambda 1$ through $\lambda n$. Since the respective output of the individual transmitters 15-1 through 15-n need to be multiplexed for generating a WDM signal, an optical multiplexer 16 is equipped. Individual input ports P1 though Pn of the optical multiplexer 16 include filter characteristics so as not to output a light except for that of a predetermined wavelength corresponding to each of the input ports.

Referring to FIG. 3, since the transmitters 15-n-1 and 15-n input lights of correct wavelength to ports 15-n-1 and P15-n of the optical multiplexer 16, they are multiplexed with other wavelength light to be output as a WDM signal.

Meanwhile, in the transmitters 15-1 and 15-2, the ports P1 and P2 to be connected are interchanged due to a wrong connection. The light of a wavelength $\lambda 1$ of the transmitter 15-1 is input to the port P2 which receives only a wavelength $\lambda 2$, while the light of a wavelength $\lambda 2$ is input to the port P1 which receives only a wavelength $\lambda 1$. In this case, the lights of the transmitters 15-1 and 15-2 are not multiplexed correctly at the optical multiplexer 16, and therefore not output as a WDM light because of the filter characteristics of the input ports. Consequently, the WDM signal is an optical multiplexed signal missing the lights of wavelengths $\lambda 1$ and $\lambda 2$.

In such a case, the problem can be solved by correcting the connection of the transmitters 15-1 and 15-2, the actual number of transmitters, however, counts up to anywhere from tens to a hundred and tens, with the same number of optical cables accompanying, making humanly very difficult to sort out a wrong connection manually and correct the misconnection.

SUMMARY OF THE INVENTION

The object for the present invention is to provide a light source wavelength control apparatus allowing a setup so that a correct wavelength is input to an optical multiplexer by automatically controlling an output wavelength at a transmitter for use in a wavelength division multiplexing (WDM) telecommunication system.

According to the present invention, a light source wavelength control apparatus comprises: a plurality of light sources; a multiplexer unit which has a plurality of input ports, inputs lights from the plurality of light sources to the different input ports respectively and outputs a multiplexed light, and of which the plurality of input ports have mutually different transmissive wavelength characteristics; a plurality of reflection light generation units, being equipped at the previous stage of the respective input ports of the multiplexer unit, for allowing a pass or not allowing it according to the transmissive wavelength characteristics at the respective input ports corresponding to an incident light from a light source, specifically, allowing a pass if the incident light is a predetermined wavelength, or not allowing a pass if the incident light is other wavelengths; and a wavelength setup unit for setting an output wavelength of the corresponding light source as the predetermined wavelength for the reflection light generation unit by detecting a reflection light from the plurality of reflection light generation units.

Enabled are a wavelength setup, for which a conventional manual work has demanded a large length of work hours, automatically and correctly by validating a relationship between a multiplexer and a wavelength, and a substantial reduction of an apparatus startup work and/or maintenance work. Also enabled by the present control is an accomplishment simply in terms of configuring and controlling an equipment, taking advantage of a capability of controlling within a small zone, that is, a detection of a reflection light by the transmitter itself for feeding back to the wavelength of its own.

BRIEF DESCRIPTION OF THE DRAWINGS

FIG. 1 is a diagram illustrating a conventional WDM optical transmission apparatus;

FIG. 11 is a flow chart showing a process sequence for setting a wavelength automatically;

FIG. 13 is a flow chart of a wavelength setup process in the case of issuing an alarm in the event of a non-identicalness between a wavelength specified for a slot and that of a set wavelength;

FIG. 14 is a diagram describing a comprisal of equipping transmitters across a plurality of shelves and for setting wavelengths; and FIG. 15 is a flow chart of a process in the case of setting wavelength across a plurality of shelves.

DESCRIPTION OF THE PREFERRED EMBODIMENTS

The preferred embodiment of the present invention is configured to add band-pass filters in the input part of a multiplexer, return a reflection light back to a transmitter if it is a wavelength not matching with the applicable port of the multiplexer, and monitor the reflection light by a photo diode (PD) equipped on the transmitter.

An adopted method is: a wavelength setup (i.e., a sequential setup, or continuous wavelength sweep setup, in a wavelength interval specified by the Telecommunication Standardization Sector (ITU-T) of the International Telecommunication Union (ITU)) is performed for an LD immediately after starting up a transmitter, followed by an automatic sweep, a judgment of a small number of reflection lights as most optimum wavelength and an automatic setup. This method makes it possible to automatically determine a wavelength solely based on a relationship between a transmissive wavelength at each port of the connected multiplexer and an oscillation wavelength of the transmitter itself independent of a slot position or the number of shelves.

Figure 2:
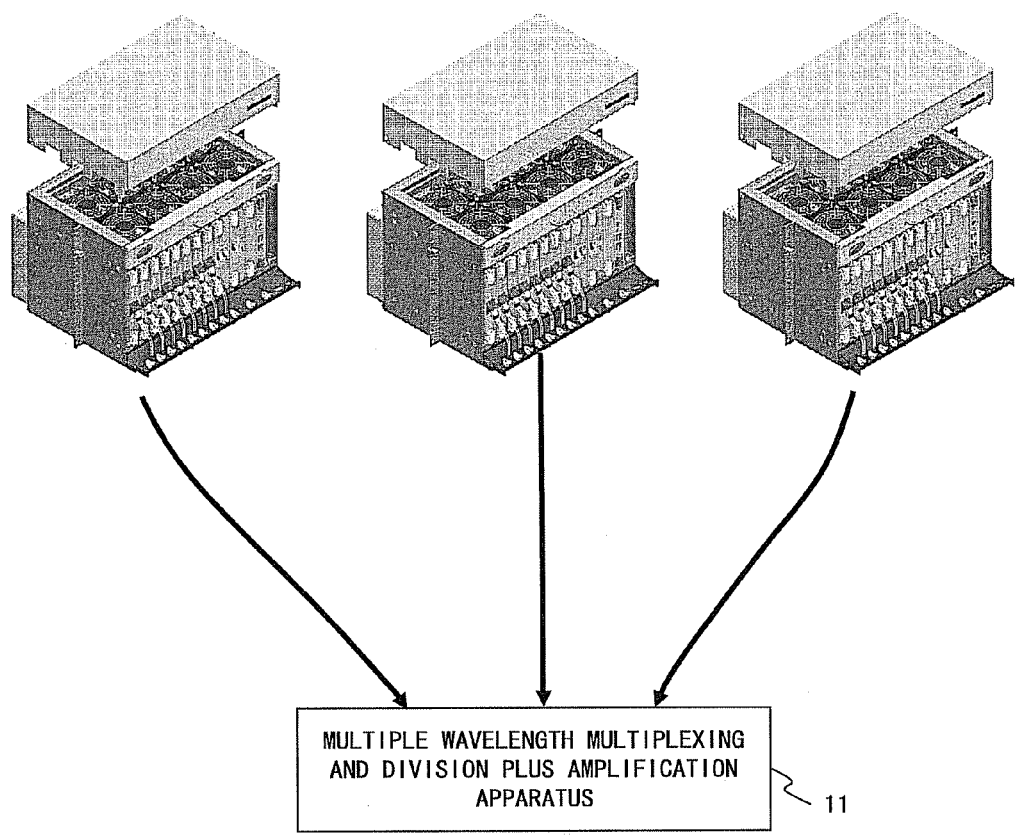
FIG. 2 is a conceptual diagram of a configuration of a transmitter for use in a multiple wavelength WDM telecommunication system.
Figure 3:
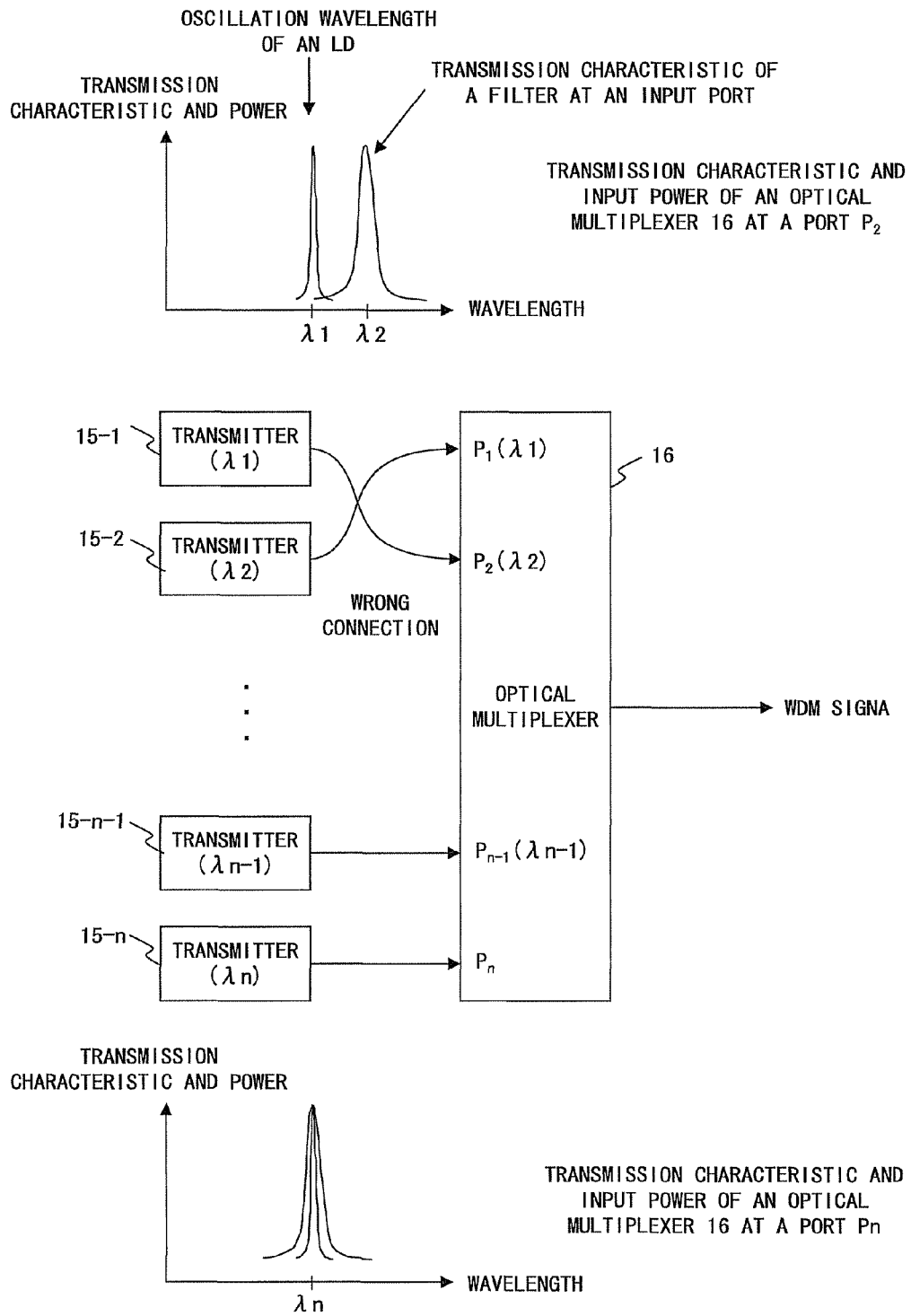
FIG. 3 is a diagram describing a problem associated with a conventional technique.
Figure 4:
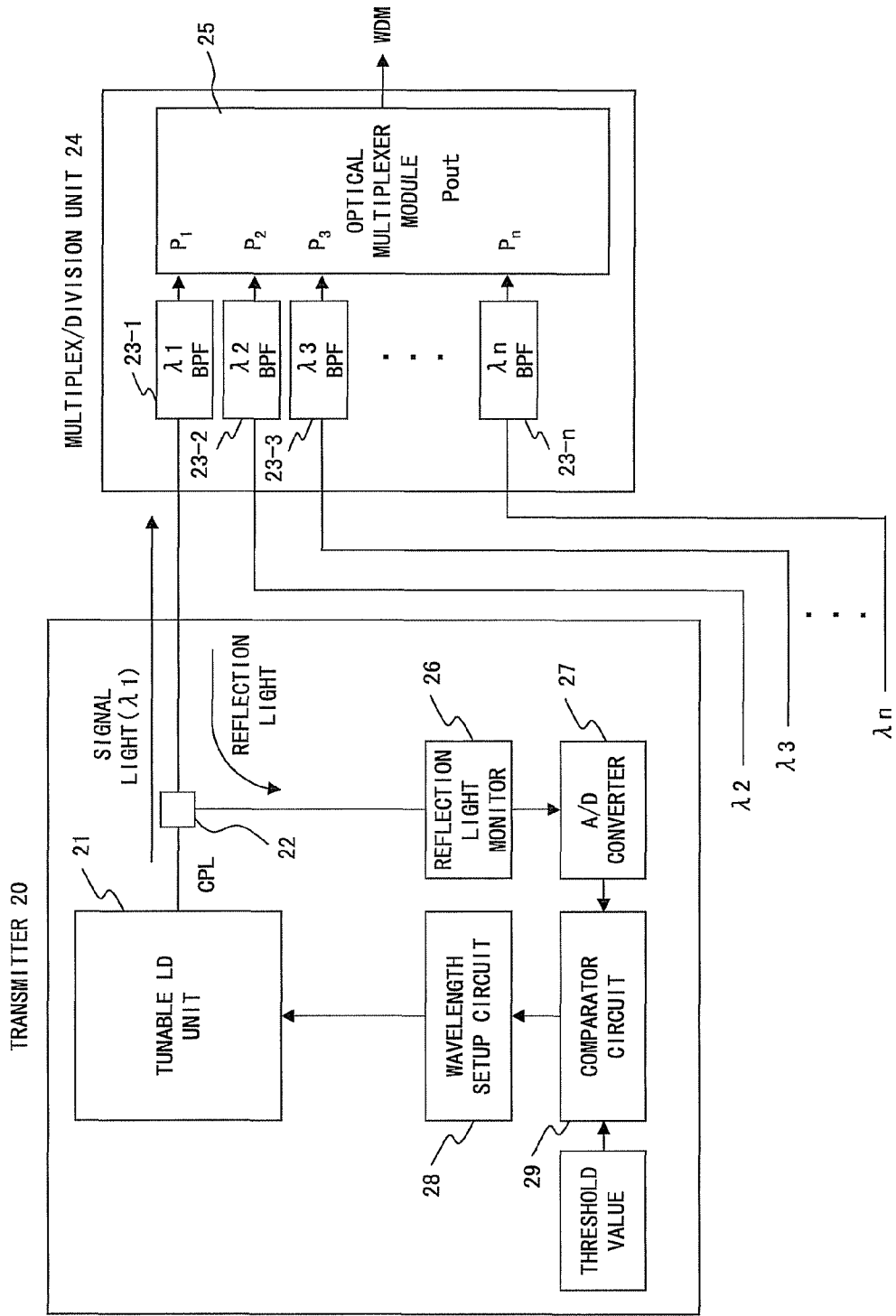
FIG. 4 is a diagram showing a fundamental comprisal of the present invention.

FIG. 4 is a diagram showing a fundamental comprisal of the present invention.

It is configured to equip band-pass filters 23-1 through 23-n between an optical multiplexer module 25 and a transmitter 20 for transmitting only desired wavelengths so as to reflect wavelengths, except for a desired wavelength, back to the transmitter 20 side, and equip it with a reflection light monitor. Band-pass filters for use in an optical signal utilize a multiple layer film filter, fiber grating, et cetera. They are configured to let a transmission wavelength light corresponding to each port pass normally, while stop other lights. In the case that an LD setup wavelength is different from a transmission wavelength of an input port of the connected optical multiplexer module 25, a reflection light is observed on the transmitter 20 side, while in the case that the LD setup wavelength is identical with the transmission wavelength, a reflection light is not observed thereby. This configuration makes it possible to comprehend a wavelength to be set for the transmitter itself.

The light output from a tunable LD unit 21 of the transmitter 20 is input to a band-pass filter 23-1 after being passed through a coupler 22. If a wavelength of a light from the tunable LD unit 21 is $\lambda 1$, it is input to a port P1 of the optical multiplexer module 25 after being passed through the band-pass filter 23-1 to be multiplexed with other wavelength lights. While the drawing shows only one transmitter 20 connected to the band-pass filter 23-1 here, the n units of transmitters 20 corresponding to the respective band-pass filters 23-1 through 23-n are actually equipped so that the light transmitting through the individual band-pass filters 23-1 through 23-n are input to the ports P1 through Pn, respectively, followed by being multiplexed and output from an output port Pout. If the wavelength of the light from the tunable LD unit 21 is one other than $\lambda 1$, the light is reflected by the band-pass filter 23-1 and input to the coupler 22 which then braches the reflection light and inputs the branched reflection light into a reflection light monitor 26 which then detects an intensity of the reflection light and inputs the detection result into an analog/digital (A/D) converter 27 which then digitizes the detection result of the reflection light monitor 26 and inputs it to a comparator circuit 29. The comparator circuit 29 compares an intensity of the digitized reflection light transmitted from the A/D converter 27 with a threshold value. The comparison result is input to a wavelength setup circuit 28 in which, if the comparison result indicates that an intensity of the reflection light is larger than the threshold value, an output wavelength of the tunable LD unit 21 is regarded as being wrong and an output wavelength thereof is accordingly set anew. Incidentally, FIG. 4 shows the band-pass filters 23-1 through 23-n as if they were housed in a multiplex/division unit 24 together with the optical multiplexer module 25.

Figure 5:
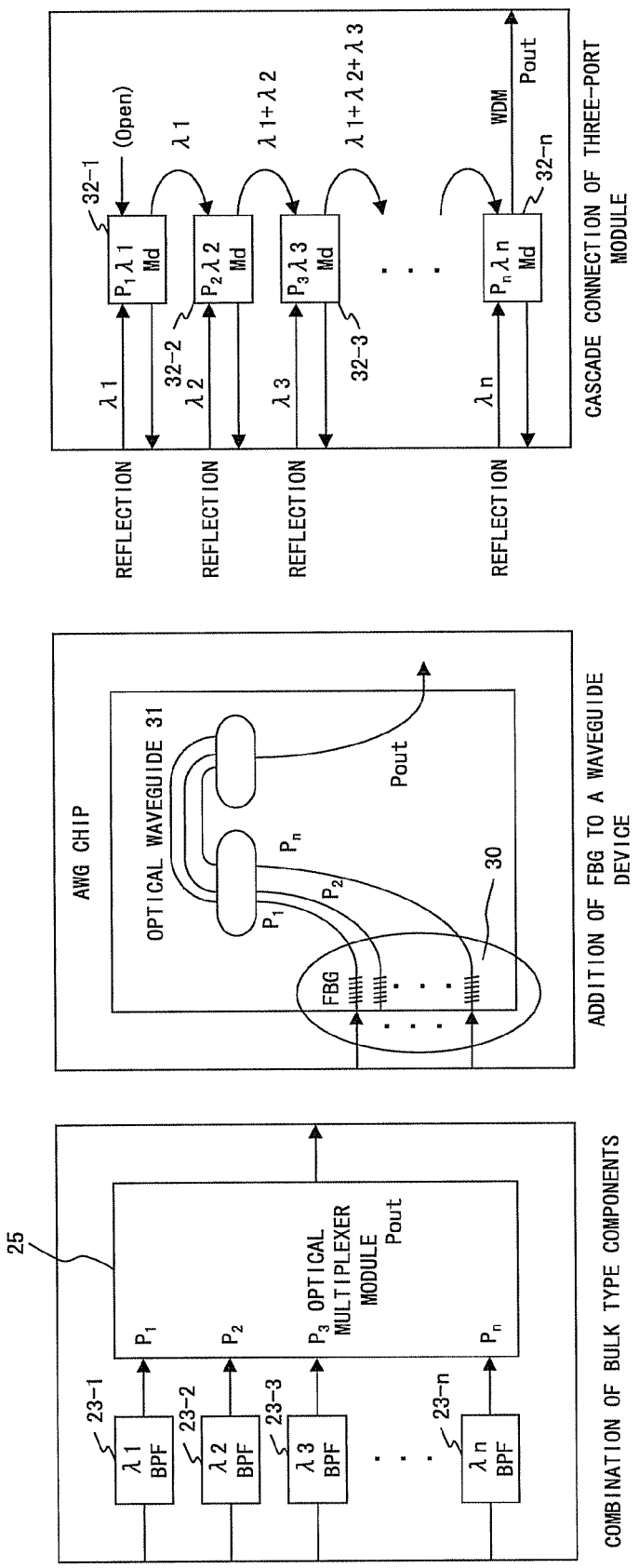
FIGS. 5A through 5C are diagrams exemplifying configurations of band-pass filters.

FIGS. 5A through 5C are diagrams exemplifying configurations of band-pass filters.

A manner for equipping a band-pass filter is different according to a type of a multiplexer to be used, a desired function, however, can be accomplished by inserting it between a transmitter and a multiplexer. It is possible to adopt either of methods of: inserting a bulk type filter module, inserting an externally attached Fiber Bragg Grating (FBG), forming a waveguide type FBG (i.e., a band-pass filter) in each input port part on a silicone substrate of an Arrayed Waveguide Grating (AWG), or using a spare port in a multiplexer connecting a three-port module in cascade. Note that the method of connecting a bulk type filter module can be applied regardless of a type of a multiplexer, which is an effective method for a configuration having a difficulty of configuring a built-in in a filter, such as an interleaver.

FIG. 5A shows a method of equipping a bulk type band-pass filter. Each of the input ports P1 through Pn of an optical multiplexer module 25 is equipped with each of band-pass filters 23-1 through 23-n having a characteristic of letting a specific wavelength, which corresponds to the port, transmit through and reflecting other wave lengths. A band-pass filter may be a multiple layered film filter, et cetera.

FIG. 5B shows a configuration of equipping an FBG 30 having a characteristic of letting a specific wavelength corresponding to each of the ports P1 through Pn and stopping other wavelengths at the input part of each port on the silicone substrate of an AWG. A light of each wavelength input from each waveguide equipped with the FBG 30 is led through an optical waveguide having an independently different length, multiplexed by an effect of interference and output, while the other wavelengths are reflected by the FBG equipped in the input part and returned to the light source side.

FIG. 5C shows a configuration of using a three-port module. The three-port module is internally equipped with band-pass filters, with each of which having a characteristic of letting only a specific wavelength corresponding to each of the ports P1 through Pn transmit through, while stopping the other wavelengths, thus letting a wavelength of $\lambda 1$ transmit through and outputting in the case of the three-port module 32-1, for example. Contrarily, the light of wavelengths other than the wavelength $\lambda 1$ is reflected within the three-port module by the band-pass filter and led to the direction which is normally closed. The preferred embodiment of the present invention is configured to use the port normally closed for detecting a light. A serial connection of the three-port modules makes it possible to multiplex lights of each wavelength in sequence, thus the light output from the output port Pout of the three-point module comprising filters of wavelengths $\lambda n$ eventually becoming a light of multiplexing wavelengths of $\lambda 1$ through $\lambda n$ as shown in FIG. 5C.

Figure 6:
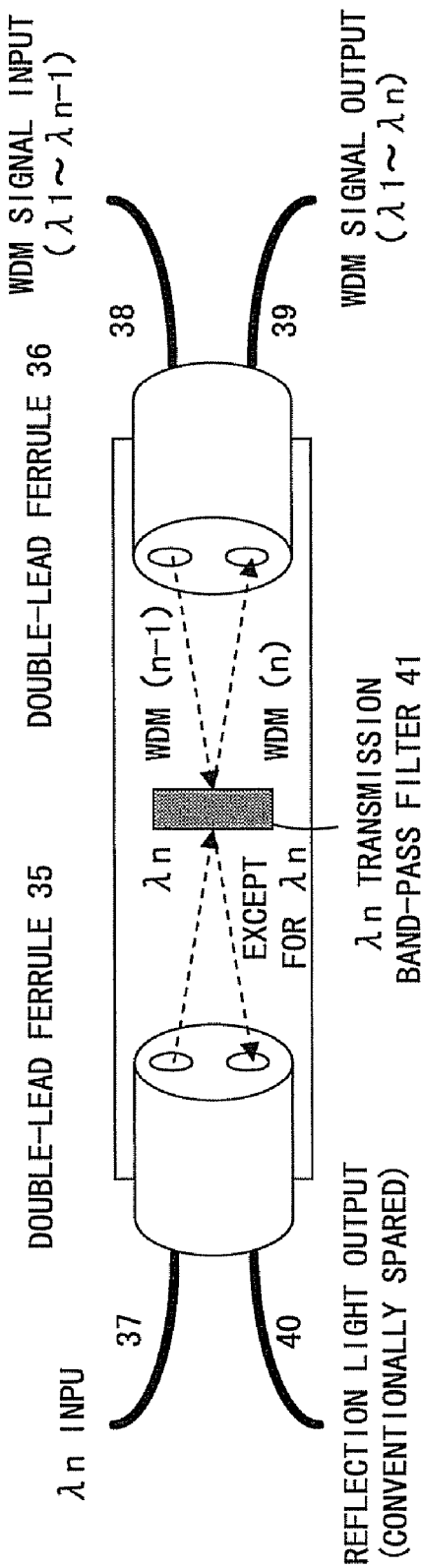
FIG. 6 is a diagram describing a three-port module used for FIG. 5C.

FIG. 6 is a diagram describing a three-port module used for the configuration shown in FIG. 5C. The three-point module is used for a small scale WDM system of up to about sixteen wavelengths in most cases. The three-point module is configured to insert a filter 41 having a desired characteristic (of letting a $\lambda n$ transmit and reflecting the other wavelengths) between opposed double-lead ferrules 35 and 36, with one of four ports being normally spared. That is, as a light of wavelength of $\lambda n$ is input from a port 37, it is let pass through the band-pass filter 41 and is output to the port 39. As a light of wavelengths of $\lambda 1$ through $\lambda n-1$ is input, it is reflected by the band-pass filter 41 and output to a port 39. This therefore results in the three-port module multiplexing lights of wavelengths $\lambda 1$ through $\lambda n-1$ and n. Contrarily, if a light input from the port 37 is of a wavelength other than the wavelengths $\lambda n$, it is reflected by the band-pass filter 41 and led to the direction of a port 40, except that the port 40 is normally a spare port. The preferred embodiment of the present invention is configured to use the spare port for a monitor, thereby accomplishing the function of detecting a reflection light without changing a structure of the three-port module. In this case, if a wavelength $\lambda n$ is included in a light incident from the port 38, a light of only the wavelength $\lambda n$ passes through the band-pass filter 41 and is output to the port 40. The fact that the $\lambda n$ is included in a light from the port 38 means there is an abnormal state occurring because a light of the wavelength $\lambda n$ is basically supposed to be input from the port 37. Therefore, in the case of the wavelength of a light from the port 37 being not normal, or a light of the wavelength to be input from the port 37 having been input to another place, it is possible to detect by discerning whether or not a light is output to the port 40.

Figure 7A:
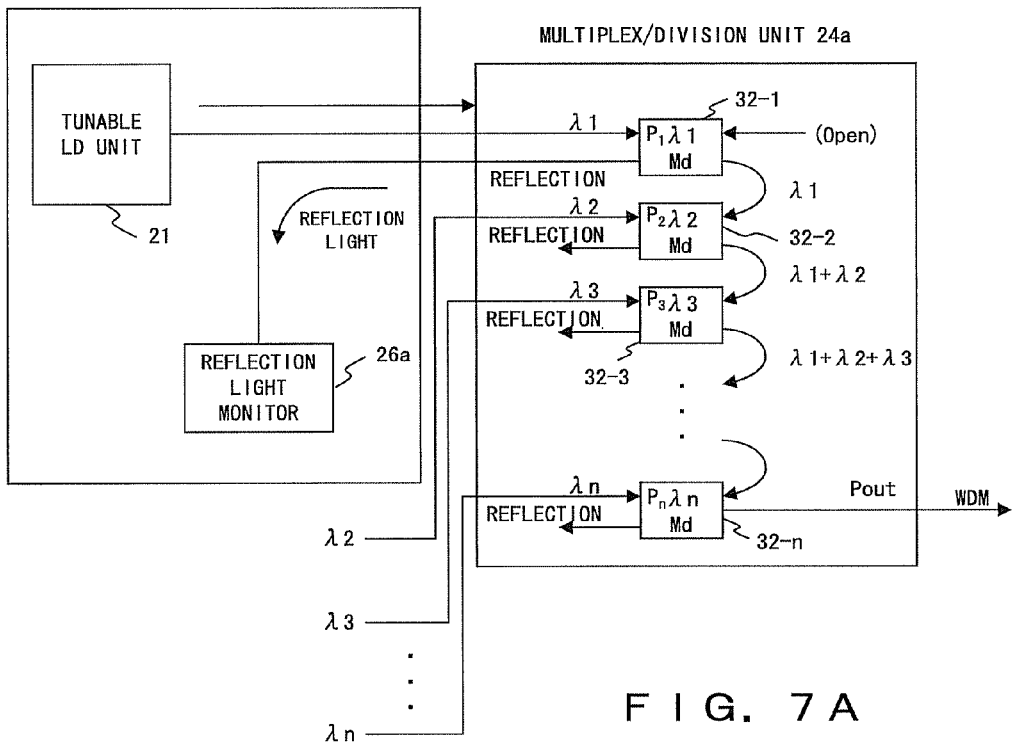
FIGS. 7A and 7B are diagrams describing a method for configuring a reflection light monitor by using a three-port module.
Figure 7B:
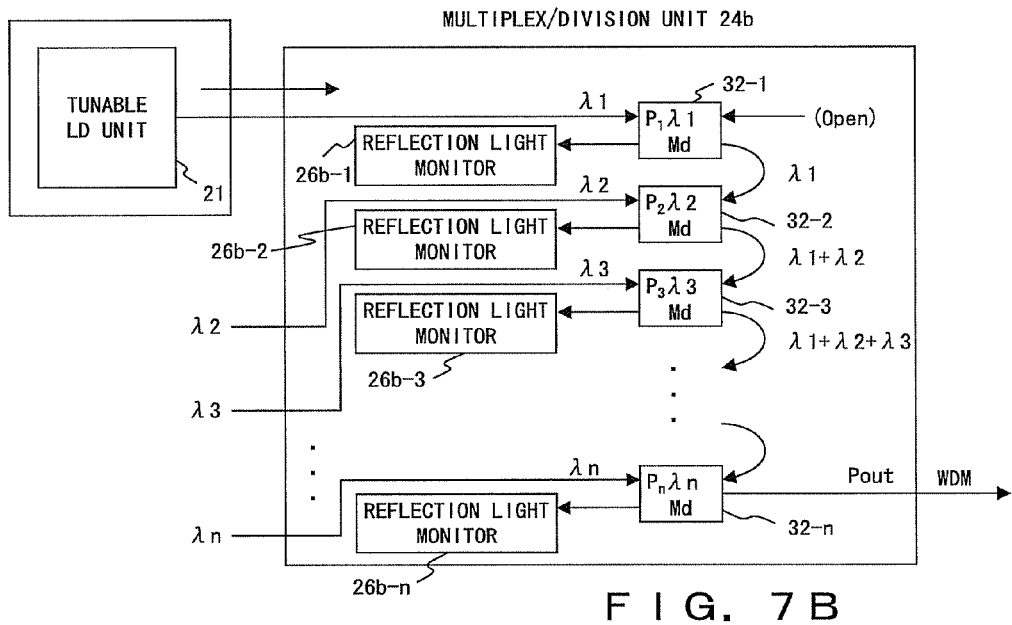

FIGS. 7A and 7B are diagrams describing a method for configuring a reflection light monitor by using a three-port module.

Either method may be employed, that is, one for equipping a multiplexer unit side with a monitor PD, or one for equipping a transmitter side with a monitor by connecting an optical fiber to each transmitter.

That is, FIG. 7A exemplifies a configuration of equipping a transmitter 20a with a reflection light monitor 26a. A multiplex/division unit 24a, being constituted by the three-point modules 32-1 through 32-n, uses a spare port as a reflection light detection-use port, has an optical fiber transfer a light output from the reflection light detection-use port to the transmitter 20a and detects the light by the reflection light monitor 26a as described for FIG. 6. In this case, although an optical fiber is required to connect from each of the three-port module 32-1 through 32-n to the reflection light monitor 26a, a wiring for a control signal given to a comprisal for controlling the tunable LD unit 21 based on a detection result of the reflection light monitor 26a can be housed within the transmitter 20a.

FIG. 7B exemplifies another configuration which houses reflection light monitors 26b-1 through 26b-n within a multiplex/division unit 24b. In this case, while an optical waveguide for transferring a reflection light from the three-point modules 32-1 through 32-n is housed within the multiplex/division unit 24b, control wirings from the reflection light monitors 26b-1 through 26b-n to each tunable LD unit 21 must be connected from the multiplex/division unit 24b to each transmitter 20b.

Note that FIG. 7A or 7B shows only one transmitter 20a or 20b, respectively; it is, however, supposed to be equipped for each of the wavelengths $\lambda 1$ through $\lambda n$.

Figure 8:
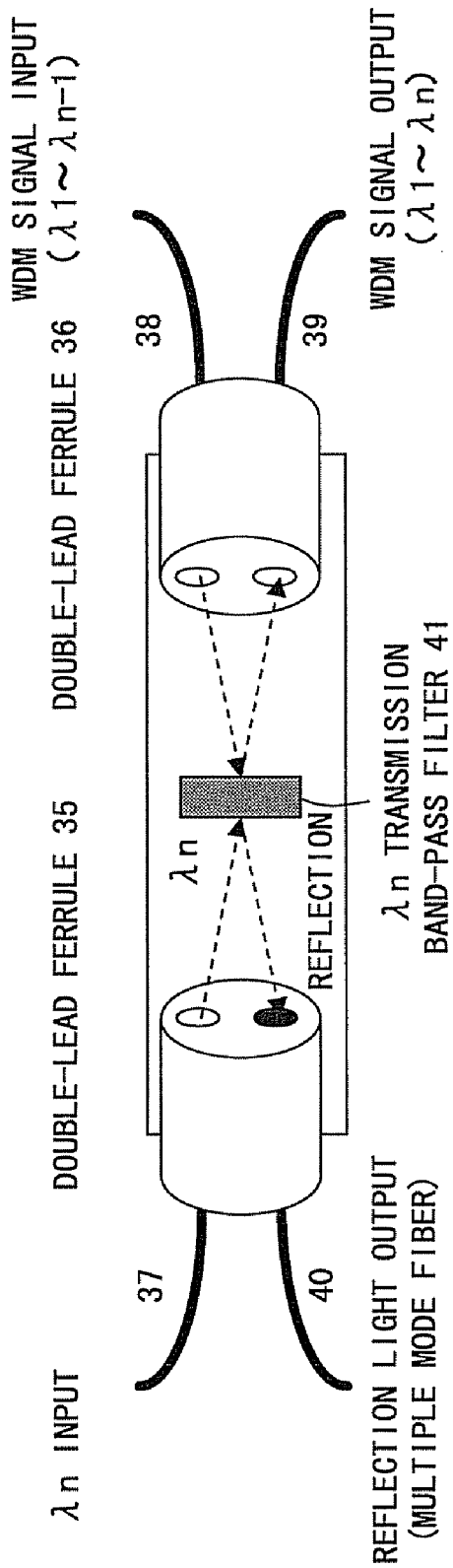
FIG. 8 is a diagram describing a method for equipping a three-port module according to a preferred embodiment of the present invention.

FIG. 8 is a diagram describing a method for equipping a three-port module according to a preferred embodiment of the present invention. In the showing of FIG. 8, the same component signs are attached to the same components for the configuration of FIG. 6.

While a new additional port, which is used to be a spare port of the three-port module, is specifically for a monitor, equipping the port with a multiple mode fiber is an effective method for a better reception of light. The use of a multiple mode fiber in the additional port not only provides an easy monitoring but also makes a light reception tolerance substantially generous, enabling an assembly of an optical system without lowering a manufacturability and accordingly suppressing a cost increase. The reason is that the multiple mode fiber has a larger diameter of the core part, that is, the part passing a light, as compared to a commonly used single mode fiber, hence being capable of receiving light even if the light path is a little displaced, and therefore it is further easier for positioning a port and a band-pass filter, providing a benefit of an easy production of the three-port module used for the preferred embodiment of the present invention.

Also in the case of using a spare port of the three-port module for a reflection light detection-use port, an opposite port thereof is equivalent to a WDM signal-use port from another three-port module connected in the upstream of the port itself, and therefore it is possible to detect if the same wavelength as that of the port itself is wrongly set for one in the upstream than the port itself (i.e., a band-pass filter of the same wavelength is wrongly installed).

In such an event, a wavelength booking alarm is issued since it is a state of double-booking a wavelength.

A conventional method has a serious difficulty in detecting a wrong connection if there is one in the connection between a multiplexer and a transmitter, whereas the preferred embodiment of the present invention is configured to determine a wavelength by examining a relationship between a transmission wavelength of the multiplexer and that of the transmitter itself.

Also, if a slot of mounting the transmitter itself can be recognized, the relationship with a setup wavelength can be compared, thereby enabling an easy identification of an abnormal position.

The method according to the preferred embodiment of the present invention is configured to make a wavelength variable by having an LD emit, and determine an optimum wavelength by monitoring a reflection light at the time of turning on the power or adding a module, an influence must not be caused to another active signal when the system is already in operation.

For example, in the case of connecting a transmission optical amplifier at the later stage of a multiplexer, if an intensity level of a light input to the amplifier is high, the amplifier erroneously recognizes "an increase in the number of wavelengths" or "an increase in the input level". If then the amplifier operates in a constant level control in this event, the level is controlled to be constant despite it is a state of the wavelength being increased, thus resulting in a decreased power per one wavelength (i.e., influencing other wavelengths) FIG. 9 is a diagram describing a problem associated with a wavelength adjustment.

A transmission apparatus 49 shown in FIG. 9 has band-pass filters 46, an optical multiplexer module 47 and an optical amplifier 48 which are equipped at later stages of transmitters 45. It is now assumed to be operated in a state of a wavelength $\lambda 3$ not existing, of which the situation is shown in FIG. 9(1). Also assumed an optical signal level of each wavelength is X1 and that the optical amplifier 48 performs a constant output level control. In this event, an optical signal of wavelength $\lambda 3$ is to be given anew. Then, the transmitter 45 sweeps wavelengths, while monitoring a reflection light from the band-pass filter 46, and sets an oscillation wavelength at $\lambda 3$. In this event, when a wavelength is suddenly set at $\lambda 3$, the light of the wavelength $\lambda 3$ is suddenly led through the optical multiplexer module 47 and input to the optical amplifier 48. Performing the amplification with a certain fixed gain, the optical amplifier 48 outputs a larger output by receiving an input of an optical signal anew. If a constant output control is performed in this event, a gain must be lowered as much as the increase in the number of wavelengths, resulting in an output level per wave becoming smaller as shown in FIG. 9(2). As the output level per wave becomes smaller, a reception level per wavelength is lowered on the receiver side, causing a signal interrupt, or an S/N ratio is worsened, degrading a communication quality. Therefore, a countermeasure for avoiding the problem must be furnished.

Figure 9:
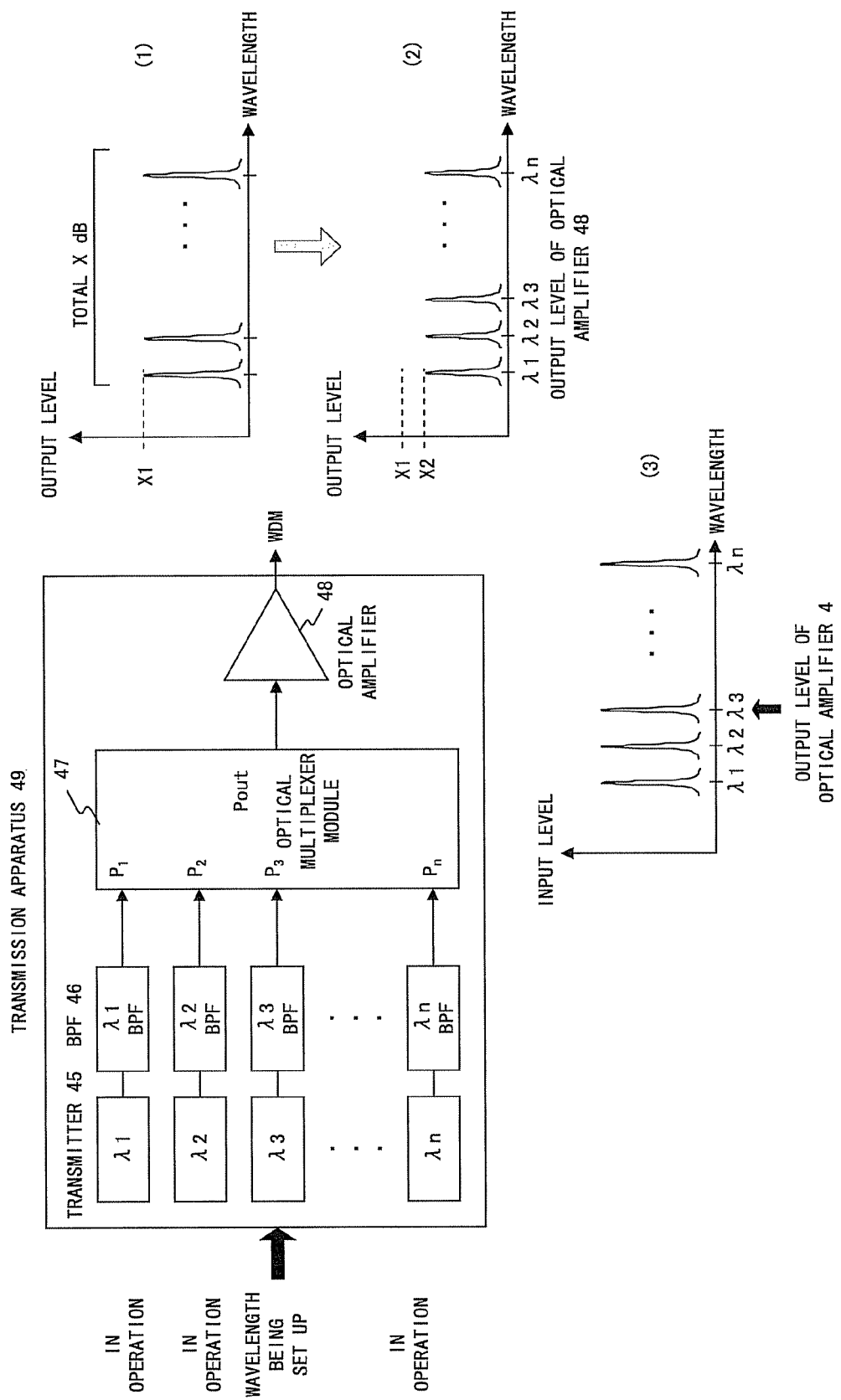
FIG. 9 is a diagram describing a problem associated with a wavelength adjustment.
Figure 10:
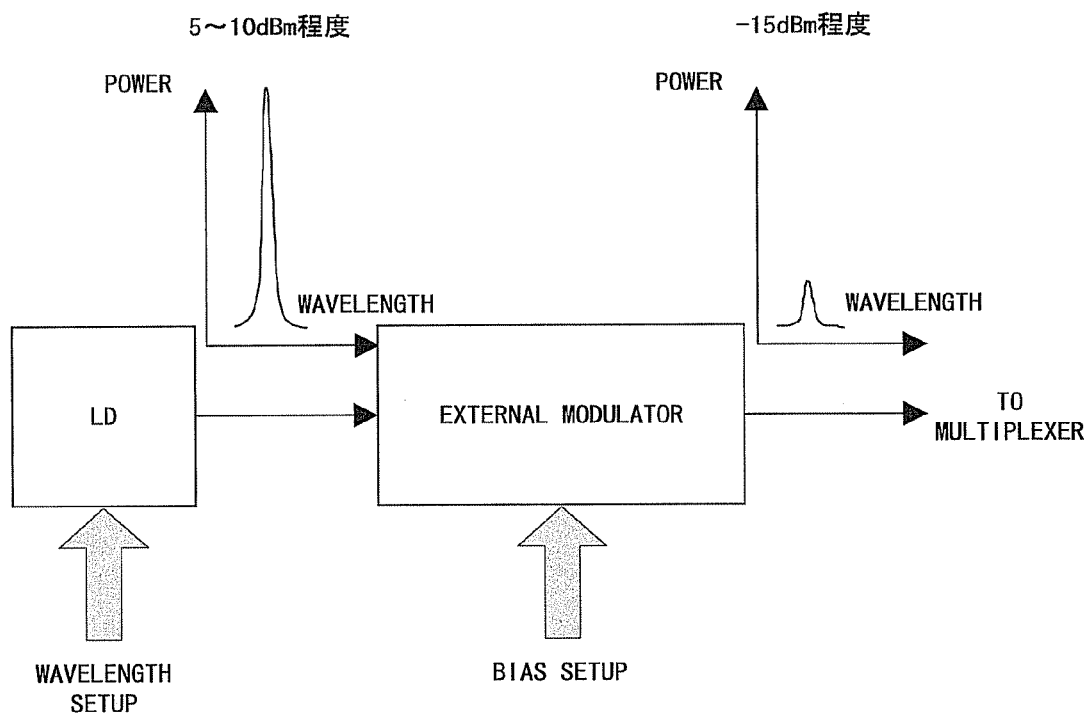
FIG. 10 is a diagram describing a method for solving the problem shown in FIG. 9.

FIG. 10 is a diagram describing a method for solving the problem shown in FIG. 9.

In the case of adjusting a wavelength in order to add an optical signal anew, a level of the new signal needs to be lowered to a level not influencing other wavelengths. However, if an LD current is adjusted for decreasing an output, an LED oscillation state will result depending on a situation, thus resulting in inability to control to an accurate wavelength and hence impractical.

Accordingly a method is adopted so as to cause a state of a large pass loss by adjusting a bias of an external modulator connected at the later stage of the LD and adjust the output of the transmitter, thereby enabling the transmitter output to be decreased without giving an influence to an oscillation wavelength. If a level input to the optical amplifier is no more than about minus 20 dBm, there is hardly a possibility of influencing another signal. Since there is a loss of a multiplexer (i.e., a degree of 2 to several dB) prior to inputting to the optical amplifier, an output from the external modulator may be decreased to a level of about minus 15 dB. That is, assuming an output of the LD about in the range of 5 to 10 dBm, an output of the external modulator may well be set at about minus 15 dB, approximately 20 dB lower than the output of the LD.

Then, the wavelength for the apparatus itself is determined by monitoring a reflection light, followed by changing the bias voltage of the external modulator to the original value to revert back to the normal state. However, this is not required for a system not using an optical amplifier because there is basically no influence between wavelengths.

FIG. 11 is a flow chart showing a process sequence for setting a wavelength automatically.

In the step S10, a unit of a transmitter is started up. Step S11 first shuts down the LD. Step S12 controls a bias of the external modulator so as to bring about a state of large attenuation of a light (i.e., optical) level such as the output level of the external modulator being approximately 20 dB lower than the input level. Step S13 confirms a presence or absence of a reflection light input to a monitor port. This step refers to the case of using a three-port module as an optical multiplexer module. The step S13 is not required if a three-port module is not used as an optical multiplexer module. If an input light the monitor port exists in the step S13, the process ends by issuing a wavelength booking alarm in the step S20 because the wavelengths are double-booked.

If the judgment of the step S13 points to an input to the monitor port not existing, the step S14 releases the LD from a shutdown so as to oscillate light. Step S15 sets a variable n, to "1", for counting a wavelength number, followed by step S16 to set a wavelength of the LD at $\lambda$n. Step S17 confirms a presence or absence of an input light to the monitor port. If an input light thereto is judged to be existent in the step S17, meaning that the wavelength is not correctly set, and accordingly the n is incremented by one ("1") in the step S19, followed by returning to the step S16 for repeating the process. Contrarily, if an input light to the monitor port is judged to be nonexistent in the step S17, meaning that the wavelength is correctly set, a bias of the external modulator is accordingly set at a default value, followed by ending the process.

Figure 12A:
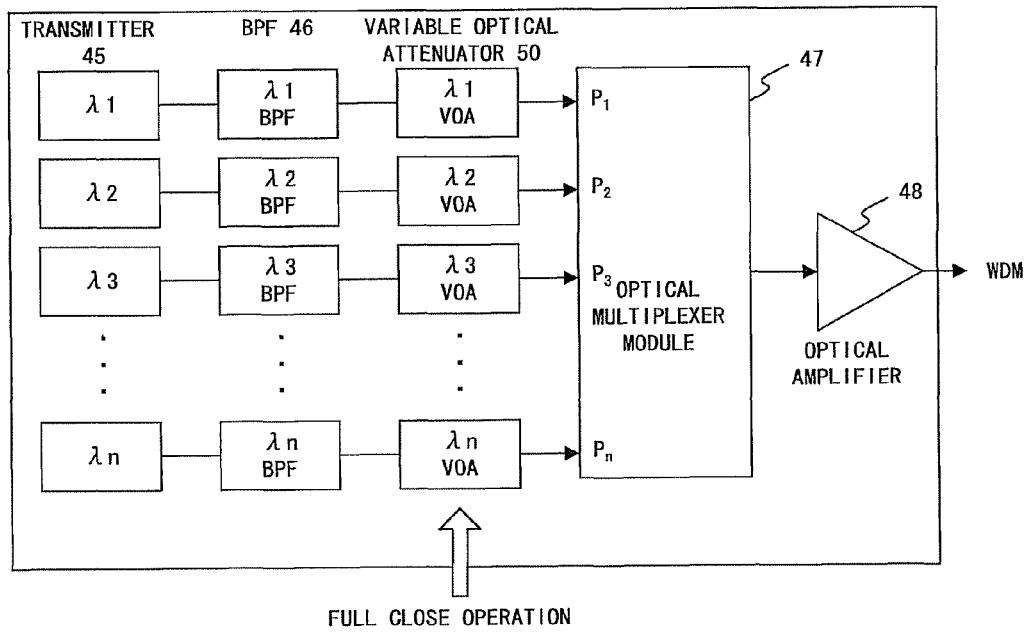
FIGS. 12A and 12B are diagrams exemplifying a comprisal in the case of a variable optical attenuator existing between a transmitter and a multiplexer.
Figure 12B:
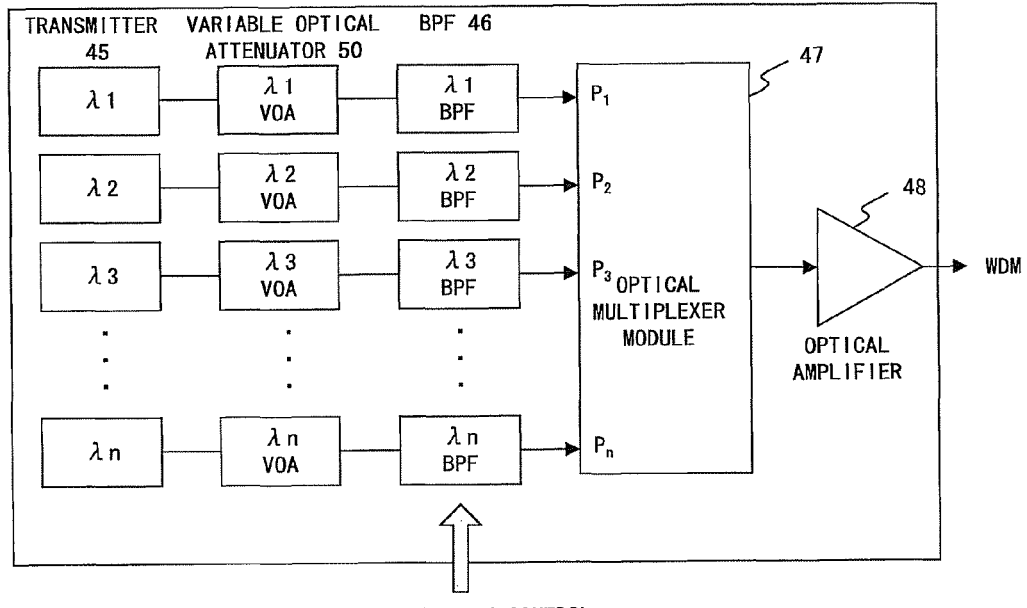

FIGS. 12A and 12B are diagrams exemplifying a comprisal in the case of a variable optical attenuator (VOA) existing between a transmitter and a multiplexer.

The telecommunication apparatus 49 is usually equipped with a variable optical attenuator (VOA). It is therefore necessary to set a wavelength by appropriately setting an attenuation of the VOA.

In the case of the band-pass filter 46, which generates a reflection light due to a wavelength displacement, existing at the previous stage of a variable optical attenuator 50 as shown in FIG. 12A, the variable optical attenuator 50 of a port, on which a wavelength is being adjusted, is brought to a full close state so as to adjust a light (i.e., an optical) level by adjusting a bias voltage of the external modulator as described before. A light signal of which a wavelength is being set does not reach the optical amplifier even if it passes through the band-pass filter 46 suddenly because the variable optical attenuator 50 is in a full close state.

Comparably, in the case of the band-pass filter 46 existing at the later stage of the variable optical attenuator 50 as shown in FIG. 12B, it is also possible to control the variable optical attenuator 50 of a port, on which a wavelength is being adjusted, to a little open state so as to make a wavelength variable, thereby making the control sequence operated. The "little open state" is defined as the state of attenuating the light from the transmitter 45 by about 20 dB as described above. That is, since the band-pass filter 46, which generates a reflection light due to a non-identicalness of wavelengths, exists at the later stage of the variable optical attenuator 50, a light of a large level is input to the optical amplifier 48 when a wavelength becomes identical with a pass band of the variable optical attenuator 50 if it is left in a full open state, resulting in bringing about the problem as described above. Contrarily, if the variable optical attenuator 50 is left in a full close state, a light from the transmitter 45 does not reach at the band-pass filter 46, resulting in an inability to adjust a wavelength. Therefore, the configuration is to adjust an attenuation of the variable optical attenuator 50 so as to obtain a light, as a reflection light, of a level enabling a wavelength adjustment while attenuating the light to a level not adversely influencing the optical amplifier 48 even if a light passes through the band-pass filter 46.

Either of these methods monitors, at the transmitter, a reflection light being generated between the multiplexer and transmitter, and controls to prevent a light from reaching at the output side of the multiplexer, and therefore it does not influence an optical characteristics; and structures a control loop in a small range, that is, controlling a bias adjustment of the modulator or an attenuation of the variable optical attenuator during a wavelength validation sequence, and therefore it makes an easy control of the entire system.

It is also possible to validate an identicalness of wavelengths by comparing the wavelength of a transmitter itself determined by the method as described above and a wavelength determined by the slot position, if the information of a slot, in which the transmitter itself is installed, is obtained when the transmitter is installed in the slot of a housing. That is, a transmitter detects as to which of the slots the transmitter itself is installed, investigates a wavelength to be oscillated by the transmitter installed in the slot, and compares it with the current wavelength oscillated by the transmitter itself, thereby making it possible to judge whether or not the transmitter operates correctly. If the wavelengths are different, it means that there is a wrong connection between the transmitter and multiplexer/divider, and it is possible to identify a place of the wrong connection easily by issuing a "wavelength mismatch alarm" from the transmitter (in which case an optical output is available because a wavelength is set by matching with a band of the multiplexer).

FIG. 13 is a flow chart of a wavelength setup process in the case of issuing an alarm in the event of a non-identicalness between a wavelength specified for a slot and that of a set wavelength.

In the step S20, a unit of a transmission apparatus is started up. Step S21 shuts down the LD. Step S22 collects, from a back board of the shelf, information of the slot position in which the transmitter itself is installed. Step S23 collects an ideal wavelength of each slot from information in a pre-prepared wavelength table. Step S24 controls a bias of the external modulator or a drive signal of the variable optical attenuator so as to suppress an erratic operation of the optical amplifier in response to a sudden input of a light. Step S25 confirms a presence or absence of an input light to the monitor port (i.e., a confirmation of the same wavelength not existing at the previous stage (in the case of using a three-port module)). If the step S25 judges a presence of an input to the monitor port, the step S34 issues a wavelength booking alarm and then ends the process. If the step S25 judges an absence of an input to the monitor port, the step S26 releases the LD shutdown, followed by the step S27 sets a wavelength number n to "1". Then, the step S28 sets an LD wavelength at λn, and the step S29 judges whether or not there is an input light to the monitor port. If an input light to the monitor port exists, the step S30 increments the n by only one ("1"), followed by returning to the step S28 for repeating the process. If the step S29 judges an absence of an input to the monitor port, the step S31 compares a wavelength from the monitor with the ideal wavelength pertaining to the slot position. If the step S31 detects a non-identicalness, the step S33 issues a wavelength non-identicalness alarm and ends the process. If the step S31 judges an identicalness, the step S32 changes the bias of the external modulator back to a default value and ends the process.

FIG. 14 is a diagram describing a comprisal of equipping transmitters across a plurality of shelves and for setting wavelengths.

Each shelf is installed the n number of transmitters. Each shelf sets a wavelength by using a reflection light as described above and also compares a usage wavelength of each slot with a setup wavelength thereof by referring to wavelength tables 55-1 through 55-m furnished in the respective shelves. The comparison process and generation of an alarm are carried out by wavelength comparison/alarm generation units 56-1 through 56-m. Monitor control units 57-1 through 57-m which are equipped in the respective shelves collect information of setup wavelengths of the respective transmitters.

Furthermore, in the case of equipping a plurality of shelves with transmitters, the monitor control units 57-1 through 57-m installed in the respective shelves are interconnected for enabling the intercommunications. Each of the individual monitor control units 57-1 through 57-m mutually exchanges the number for the shelf itself. The number is one allocated to each shelf so that each shelf is obliged to set, to the shelf, a wavelength corresponding to the number allocated to the shelf itself. Therefore, each of the monitor control units 57-1 through 57-m examines whether or not a shelf of the same number as the shelf itself exists elsewhere, thereby enabling a monitor so as to prevent the same wavelength being set. Note that the shelf number is set in each of the monitor control units 57-1 through 57-m by a user.

FIG. 15 is a flow chart of a process in the case of setting wavelength across a plurality of shelves.

A unit of a transmission apparatus is started up in the step S40. Step S41 shuts down the LD. Step S42 collects, from a back board of the shelf, information of the slot position in which the transmitter itself is installed. A user sets the shelf number in the step S43. The configuration inhibits an operation of the shelf if the setup is not complete. Step S44 collects the shelf number and an ideal wavelength of each slot from information in a pre-prepared wavelength table. Step S45 exchanges the shelf numbers with other shelves. Step S46 confirms a presence or absence of a shelf of the same number. If the step S46 judges a presence of a shelf of the same number, the process proceeds to the step 57. If the step S46 judges an absence of a shelf of the same number, the step S47 controls a bias of the external modulator or a drive signal of the variable optical attenuator so as to suppress an erratic operation of the optical amplifier in response to a sudden input of a light. Step S48 confirms a presence or absence of an input light to the monitor port (i.e., a confirmation of the same wavelength not existing at the previous stage (in the case of using a three-port module)). If step S48 judges a presence of an input to the monitor port, the step S57 issues a wavelength booking alarm and ends the process. If step S48 judges an absence of an input to the monitor port, the step S49 releases the LD shutdown, followed by the step S50 incrementing the wavelength number by "1". Then step S51 sets an LD wavelength at n, and step S52 judges a presence or absence of an input light to the monitor port. If an input to the monitor port is present, the step S53 increments the n by one ("1") and the process returns to the step S51 for repeating the process. If the step S52 judges an absence of an input to the monitor port, the step S54 compares a wavelength according to the monitor with the ideal wavelength pertaining to the slot position. If the step S54 detects a non-identicalness, the step S56 issues a wavelength non-identicalness alarm and ends the process. If the step S54 judges identicalness, the step S55 changes the bias of the external modulator back to the default value and ends the process.

What is claimed is:

1. A light source wavelength control apparatus, comprising:
   a plurality of light sources;
   a multiplexer, which has a plurality of input ports, inputs lights from the plurality of light sources to the different input ports respectively and outputs a multiplexed light, and of which the plurality of input ports have mutually different transmissive wavelength characteristics;
   a plurality of reflection light generators, being equipped at the previous stage of the respective input ports of the multiplexer, to allow a pass or not to allow a pass according to the transmissive wavelength characteristics at the respective input ports corresponding to an incident light from a light source, specifically, to allow a pass if the incident light is a predetermined wavelength, or not to allow a pass if the incident light is other wavelengths, the incident light being not allowed to pass is reflected back to the light source from which the incident light is emitted;
   a wavelength setup circuit to set an output wavelength of the corresponding light source as the predetermined wavelength for the reflection light generator by detecting a reflection light from the plurality of reflection light generators; and
   an attenuator to attenuate a light incident to said multiplexer when a wavelength becomes the predetermined wavelength and to pass the light without attenuation when a wavelength is not the predetermined wavelength while said wavelength setup circuit sets a wavelength.

2. The light source wavelength control apparatus according to claim 1, wherein
   said reflection light generator is a band-pass filter letting a predetermined light pass.

3. The light source wavelength control apparatus according to claim 2, wherein
   said reflection light generator utilizes a bulk type optical module.

4. The light source wavelength control apparatus according to claim 2, wherein
   said reflection light generator utilizes a Fiber Bragg Grating (FBG).

5. The light source wavelength control apparatus according to claim 2, wherein
   said reflection light generator utilizes a waveguide built-in type Fiber Bragg Grating.

6. The light source wavelength control apparatus according to claim 1, wherein
   said multiplexer utilizes a waveguide type module.

7. The light source wavelength control apparatus according to claim 1, wherein
   said reflection light generator is equipped between said light source and multiplexer.

8. The light source wavelength control apparatus according to claim 1, constituting
   said multiplexer and reflection light generator by three-port module which uses a spare port as a reflection light monitor-use port.

9. The light source wavelength control apparatus according to claim 8, wherein
   a multi-mode fiber is equipped on said reflection light monitor-use port of said three-port module.

10. The light source wavelength control apparatus according to claim 8, further comprising:
    a judger to judge whether or not a light of the same wavelength as that of a wavelength to be multiplexed is included in a light transmitted from the previous stage by detecting a light appearing at the reflection light monitor-use port and to generate an alarm if a light of the same wavelength is included therein in the case of constituting said multiplexer by a three-port module equipped with a reflection light monitor-use port.

11. The light source wavelength control apparatus according to claim 1, wherein
    said attenuator is an optical attenuator.

12. The light source wavelength control apparatus according to claim 1, wherein
    said attenuator is accomplished by controlling an output of an external modulator at an output which is approximately 20 dB lower that of said light source.

13. The light source wavelength control apparatus according to claim 1, further comprising:
    a detector to detect whether or not a wavelength set by said wavelength setup circuit is different from a wavelength to be output at a slot into which said light source is inserted, and
    to issue an alarm if the former is different from the latter.

* * * * *

UNITED STATES PATENT AND TRADEMARK OFFICE
CERTIFICATE OF CORRECTION

| | | |
|---|---|---|
| PATENT NO. | : 8,184,990 B2 | Page 1 of 1 |
| APPLICATION NO. | : 11/561505 | |
| DATED | : May 22, 2012 | |
| INVENTOR(S) | : Toshihiro Ohtani | |

It is certified that error appears in the above-identified patent and that said Letters Patent is hereby corrected as shown below:

Column 12, Line 48, In claim 12, delete "that" and insert -- that that --, therefor.

Signed and Sealed this
Seventh Day of August, 2012

David J. Kappos
*Director of the United States Patent and Trademark Office*